United States Patent
Hunt et al.

(10) Patent No.: US 11,276,199 B2
(45) Date of Patent: Mar. 15, 2022

(54) IMAGE TEMPLATE BASED TRACKING

(71) Applicant: THE BOEING COMPANY, Chicago, IL (US)

(72) Inventors: Jeffrey H. Hunt, El Segundo, CA (US); Caleb G. Price, Shiloh, IL (US)

(73) Assignee: THE BOEING COMPANY, Chicago, IL (US)

( * ) Notice: Subject to any disclaimer, the term of this patent is extended or adjusted under 35 U.S.C. 154(b) by 47 days.

(21) Appl. No.: 16/792,598

(22) Filed: Feb. 17, 2020

(65) Prior Publication Data

US 2021/0256730 A1 Aug. 19, 2021

(51) Int. Cl.
| | | |
|---|---|---|
| *G06T 7/73* | (2017.01) | |
| *G06K 9/62* | (2022.01) | |
| *G06T 7/246* | (2017.01) | |

(52) U.S. Cl.
CPC .............. *G06T 7/74* (2017.01); *G06K 9/6202* (2013.01); *G06T 7/248* (2017.01); *G06T 2207/10048* (2013.01); *G06T 2207/20061* (2013.01)

(58) Field of Classification Search
CPC ........... G06T 7/74; G06T 7/248; G06T 7/337; G06T 7/174; G06T 7/001; G06T 7/0016; G06T 2207/20061; G06T 2207/10048; G06K 9/6202; G06K 9/3241; G06K 9/4604

See application file for complete search history.

(56) References Cited

U.S. PATENT DOCUMENTS

| | | | | |
|---|---|---|---|---|
| 6,445,832 | B1 * | 9/2002 | Lee | G06K 9/32 382/266 |
| 9,224,060 | B1 * | 12/2015 | Ramaswamy | G06K 9/00389 |
| 11,004,212 | B1 * | 5/2021 | Liu | G06K 9/6202 |
| 2004/0054473 | A1 * | 3/2004 | Shimomura | G06T 7/248 701/301 |
| 2013/0058525 | A1 * | 3/2013 | Sugio | G06K 9/00261 382/103 |
| 2013/0123009 | A1 | 5/2013 | Maharbiz et al. | |
| 2015/0356743 | A1 * | 12/2015 | Kintou | G06T 7/248 382/103 |
| 2019/0247126 | A1 * | 8/2019 | Ikehara | A61B 1/0638 |

OTHER PUBLICATIONS

Open Source Computer Vision, "Hough Circle Transform", https://docs.opencv.org/master/da/d53/tutorial_py_houghcircles.html, printed on Feb. 17, 2020, 1 pg.

* cited by examiner

*Primary Examiner* — Ian L Lemieux
(74) *Attorney, Agent, or Firm* — Moore Intellectual Property Law, PLLC

(57) ABSTRACT

An image analyzer is configured to use an image processing technique to detect coordinates of a region of a first image frame that matches a target template and update the target template by copying a portion of the first image frame corresponding to the coordinates and a first size. The image analyzer is also configured to receive a second image frame and generate a plurality of pixel match counts based on a comparison of the target template with a plurality of regions of the first size of the second image frame. The image analyzer is further configured to determine that a region of the second image frame matches the target template based on a pixel match count of the second region. The image analyzer is configured to generate an output indicating coordinates of the region of the second image frame.

20 Claims, 9 Drawing Sheets

IMAGE TEMPLATE BASED TRACKING

FIELD OF THE DISCLOSURE

The present disclosure is generally related to image template based tracking.

BACKGROUND

Typically, an image search involves comparing a template image of an object with an image frame to determine whether the object is detected in the image frame. An image of an object may differ from a template image of the same object in cases where the object is captured from a different angle or a different distance in the image as compared to the template image. In such cases, an image search can have difficulty (e.g., errors) in detecting the object in the image frame.

SUMMARY

In a particular implementation, a device for image processing includes a memory and one or more processors. The memory is configured to store a target template. The one or more processors are configured to receive a first image frame from an image sensor. The one or more processors are also configured to use an image processing technique to detect first coordinates of a first region of the first image frame that matches the target template. The one or more processors are further configured to update the target template by copying a portion of the first image frame corresponding to the first coordinates and a first size. The one or more processors are also configured to receive a second image frame from the image sensor. The one or more processors are further configured to generate a plurality of pixel match counts based on a comparison of the target template with a plurality of regions of the first size of the second image frame. The one or more processors are also configured to determine that a second region of the second image frame matches the target template based at least in part on determining that a particular pixel match count of the second region corresponds to a highest pixel match count of the plurality of pixel match counts. The one or more processors are further configured to generate an output indicating second coordinates of the second region of the second image frame.

In another particular implementation, a method of image processing includes receiving a first image frame from an image sensor. The method also includes using an image processing technique to detect first coordinates of a first region of the first image frame that matches a target template. The method further includes updating the target template by copying a portion of the first image frame corresponding to the first coordinates and a first size. The method also includes receiving a second image frame from the image sensor. The method further includes generating a plurality of pixel match counts based on a comparison of the target template with a plurality of regions of the first size of the second image frame. The method also includes determining that a second region of the second image frame matches the target template based at least in part on determining that a particular pixel match count of the second region corresponds to a highest pixel match count of the plurality of pixel match counts. The method further includes generating an output indicating second coordinates of the second region of the second image frame.

In another particular implementation, a computer-readable storage device stores instructions that, when executed by one or more processors, cause the one or more processors to receive a first image frame from an image sensor. The instructions, when executed by the one or more processors, also cause the one or more processors to use an image processing technique to detect first coordinates of a first region of the first image frame that matches a target template. The instructions, when executed by the one or more processors, further cause the one or more processors to update the target template by copying a portion of the first image frame corresponding to the first coordinates and a first size. The instructions, when executed by the one or more processors, also cause the one or more processors to receive a second image frame from the image sensor. The instructions, when executed by the one or more processors, further cause the one or more processors to generate a plurality of pixel match counts based on a comparison of the target template with a plurality of regions of the first size of the second image frame. The instructions, when executed by the one or more processors, also cause the one or more processors to determine that a second region of the second image frame matches the target template based at least in part on determining that a particular pixel match count of the second region corresponds to a highest pixel match count of the plurality of pixel match counts. The instructions, when executed by the one or more processors, further cause the one or more processors to generate an output indicating second coordinates of the second region of the second image frame.

The features, functions, and advantages described herein can be achieved independently in various implementations or may be combined in yet other implementations, further details of which can be found with reference to the following description and drawings.

DETAILED DESCRIPTION

Aspects disclosed herein present systems and methods of image template based tracking. An image analyzer receives image frames from an image sensor. The image analyzer uses an image processing technique to detect an object in a first image frame. For example, the image analyzer uses the image processing technique to detect first coordinates of a match region of the first image frame that matches a target template of the object. The image analyzer updates the target template by copying a portion of the first image frame that corresponds to the first coordinates. For example, the portion of the first image frame includes the match region. The image analyzer tracks the object in subsequent image frames based on a pixel-by-pixel comparison of regions of the subsequent image frames and the updated target template. The updated target template can more closely resemble the object as captured by the image sensor, resulting in fewer (e.g., none) image detection errors.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 8:
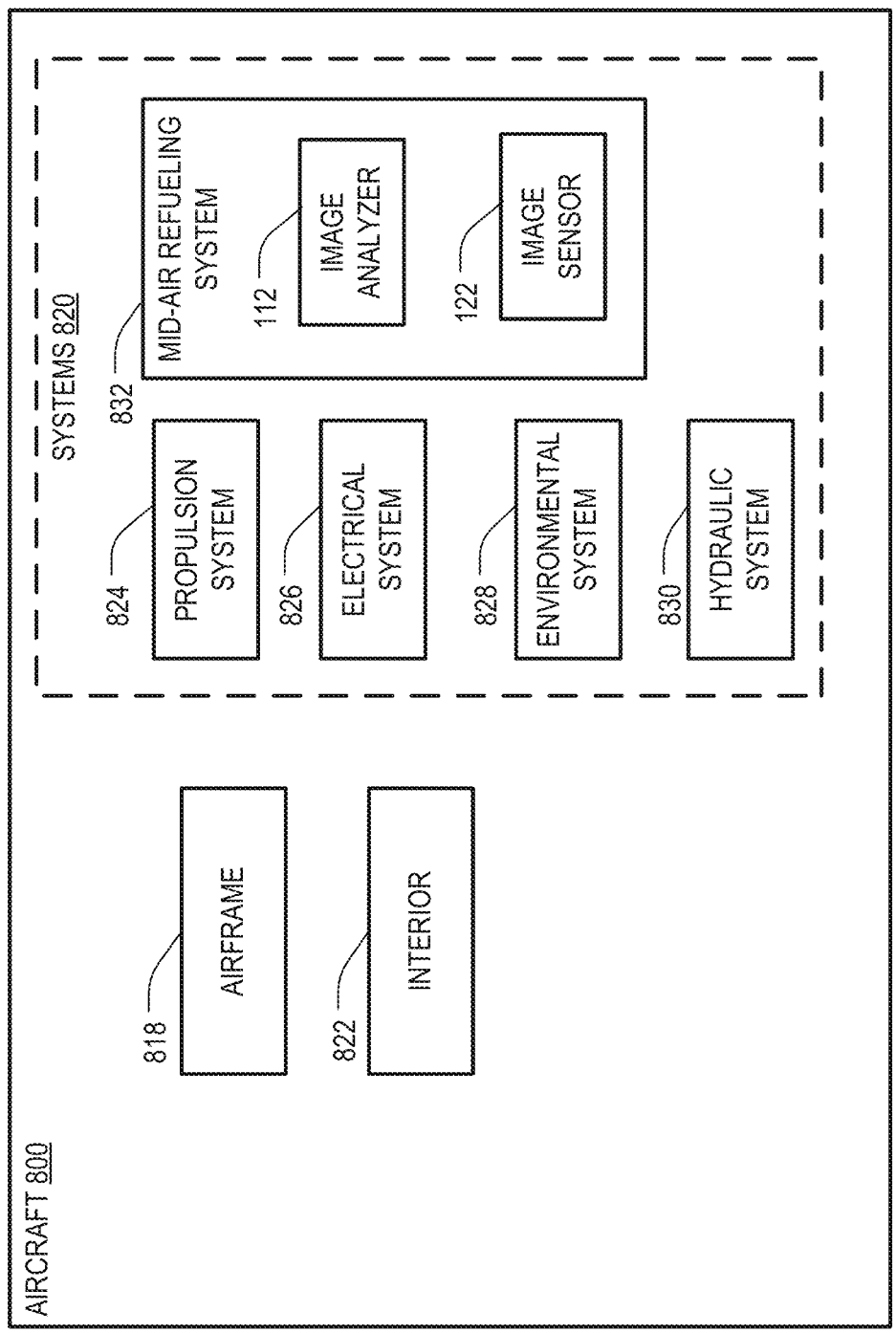
FIG. 8 is a block diagram of an aircraft that is configured to perform image template based tracking.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 8 depicts a computing device 910 that includes one or more processors 920, which indicates that in some implementations the computing device 910 includes a single processor 920 and in other implementations the computing device 910 includes multiple processor 920. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
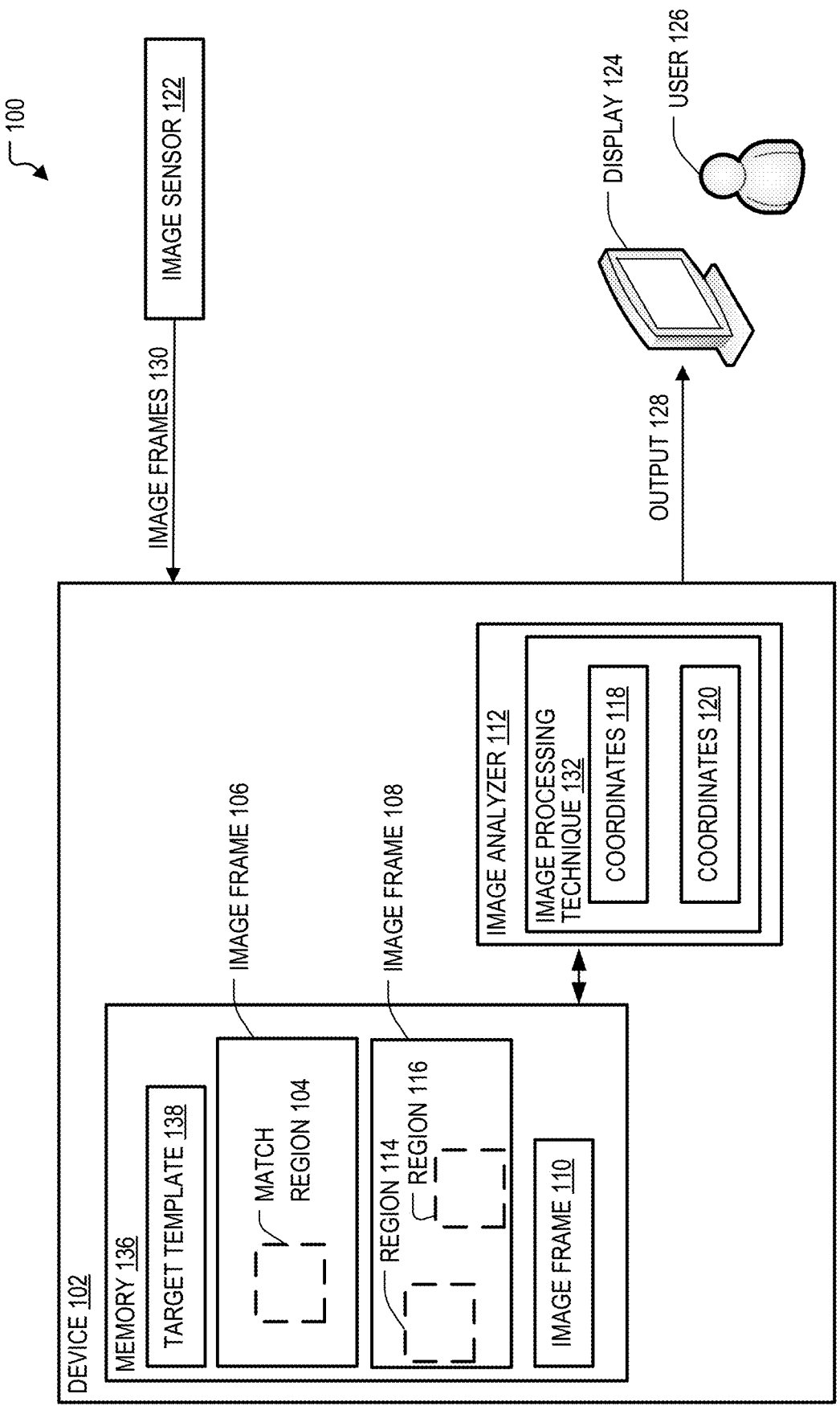
FIG. 1 is a block diagram that illustrates an example of a system operable to perform image template based tracking.

Referring to FIG. 1, a system operable to perform image template based tracking is shown and generally designated as system 100. The system 100 includes a device 102 coupled to an image sensor 122, a display 124, or both. In a particular aspect, the image sensor 122 includes a still image camera, a video camera, an infrared camera, or a combination thereof. In a particular aspect, the display 124 includes a computer monitor, a touch screen, an instrument panel display, or a combination thereof. It should be understood that although the image sensor 122 and the display 124 are illustrated as external to the device 102, in some implementations that image sensor 122, the display 124, or both, are integrated into the device 102.

The device 102 includes a memory 136, an image analyzer 112, or both. Although the image analyzer 112, the device 102, the image sensor 122, and the display 124 are depicted as separate components, in other implementations the described functionality of two or more of the image analyzer 112, the device 102, the image sensor 122, and the display 124 can be performed by a single component. In some implementations, the image analyzer 112 can be represented in hardware, such as via an application-specific integrated circuit (ASIC) or a field-programmable gate array (FPGA), or the operations described with reference to the elements may be performed by a processor executing computer-readable instructions.

The memory 136 is configured to store a target template 138. For example, the target template 138 includes an image of at least a portion of an object to be tracked. For example, the object includes a drogue basket that is attached to a fuel tanker and is to be tracked by an aircraft to enable inflight refueling of the aircraft, as further described with reference to FIG. 5. In a particular implementation, the target template 138 is received from a user 126, another device, or both. In a particular implementation, the target template 138 is received from a provider (e.g., a manufacturer, a retailer, or both) of the object.

During operation, a user 126 (e.g., a pilot of an aircraft) activates the image sensor 122 to generate one or more image frames 130 (e.g., color image frames, greyscale image frames, infrared image frames, etc). For example, the image frames 130 include an image frame 106, an image frame 108, and an image frame 110 captured at a first time, a second time, and a third time, respectively. To illustrate, a timestamp associated with an image frame indicates a time at which the image frame is captured by the image sensor 122. In a particular aspect, the second time is subsequent to the first time and the third time is subsequent to the second time.

The image analyzer 112 processes the image frames 130, as further described with reference to FIG. 2. For example, the image analyzer 112 uses an image processing technique 132 to determine whether an image frame of the image frames 130 matches the target template 138. In a particular example, the object to be tracked (e.g., a drogue basket) has a circular shape. In this example, the image processing technique 132 can include a Hough circle transform or another image processing technique designed to detect circular shapes. The image analyzer 112 uses the image processing technique 132 to determine coordinates 118 of a match region 104 of the image frame 106 that matches the target template 138. In a particular aspect, the image analyzer 112 generates an output 128 indicating the coordinates 118 of the match region 104 and provides the output 128 to the display 124.

The image analyzer 112, in response to determining that the image frame 106 includes the match region 104 that matches the target template 138, updates the target template 138 by copying a portion of the image frame 106 corresponding to the coordinates 118 and a first size. In a particular example, the first size is equal to a size of the match region 104 (e.g., a region size). In this example, the image analyzer 112 updates the target template 138 by copying the match region 104. To illustrate, the image analyzer 112 replaces a previous version of the target template 138 (used to find the match region 104) with the match region 104. In a particular example, the first size is based on a configuration setting, a user input, a default value, or a combination thereof. In this example, the image analyzer 112 replaces the previous version of the target template 138 with a portion of the image frame 106 that includes at least a portion of the match region 104. To illustrate, in cases where the first size is smaller than the region size, the image analyzer 112 replaces the target template 138 with a portion of the match region 104. For example, a portion of the object to be tracked (e.g., a drogue basket) can include a distinctive pattern and the image analyzer 112 may update the target template 138 to include a portion of the image frame 106 corresponding to the portion of the object to be tracked. In a particular aspect, although the match region 104 is considered a match for the previous version of the target template 138 by the image processing technique 132, the match region 104 may differ from (e.g., is not an exact copy of) the previous version of the target template 138. Updating the target template 138 enables the target template 138 to more closely resemble the object as captured by the image sensor 122.

The image analyzer 112, subsequent to updating the target template 138 based on the image frame 106, processes the image frame 108, as further described with reference to FIG. 3. For example, the image analyzer 112 compares a plurality of regions of the image frame 108 to the target template 138. In a particular aspect, each of the plurality of regions has the same size as the size of the target template 138. In a particular aspect, one or more of the plurality of regions overlap one or more other regions of the plurality of regions. To illustrate, the image analyzer 112 performs a pixel-by-pixel comparison to generate a first match count indicating a count of pixels of the region 114 that are within a pixel value threshold of a corresponding pixel of the target template 138. Similarly, the image analyzer 112 performs a pixel-by-pixel comparison to generate a second match count indicating a count of pixels of the region 116 that are within a pixel value threshold of a corresponding pixel of the target template 138. The image analyzer 112 selects the region 116 in response to determining that the second match count corresponds to a highest pixel match count for the plurality of regions. The image analyzer 112 in response to determining that coordinates 120 of the region 116 are within a distance threshold of the coordinates 118 of the match region 104, designates the region 116 as matching the target template 138. For example, the object to be tracked is unlikely to move more the distance threshold from one image frame to the next image frame. In a particular aspect, the image analyzer 112 generates match counts for regions of the image frame 108 that are within the distance threshold of the coordinates 118 and refrains from generating match counts for regions of the image frame 108 that are outside the distance threshold of the coordinates 118. Disregarding regions that are outside the distance threshold can conserve resources, such as processing cycles, time, memory usage, or a combination thereof.

The image analyzer 112 generates an output 128 indicating the coordinates 120. For example, the output 128 includes a graphical user interface that indicates the coordinates 120, the region 116 of the image frame 108, or both. The image analyzer 112 provides the output 128 to the display 124. In a particular aspect, the user 126 (e.g., a pilot) can use the output 128 (e.g., the coordinates 120) to aim a probe to engage with the drogue basket to initiate refueling, as further described with reference to FIG. 5.

The system 100 thus enables using a combination of an image processing technique 132 and pixel-by-pixel comparison to detect an object to be tracked. For example, the image processing technique 132 can be used to focus the pixel-by-pixel comparison in regions that are more likely to correspond to the object to be tracked. The system 100 also enables updating of the target template 138 to more closely match the object as captured by the image sensor 122.

Figure 2:
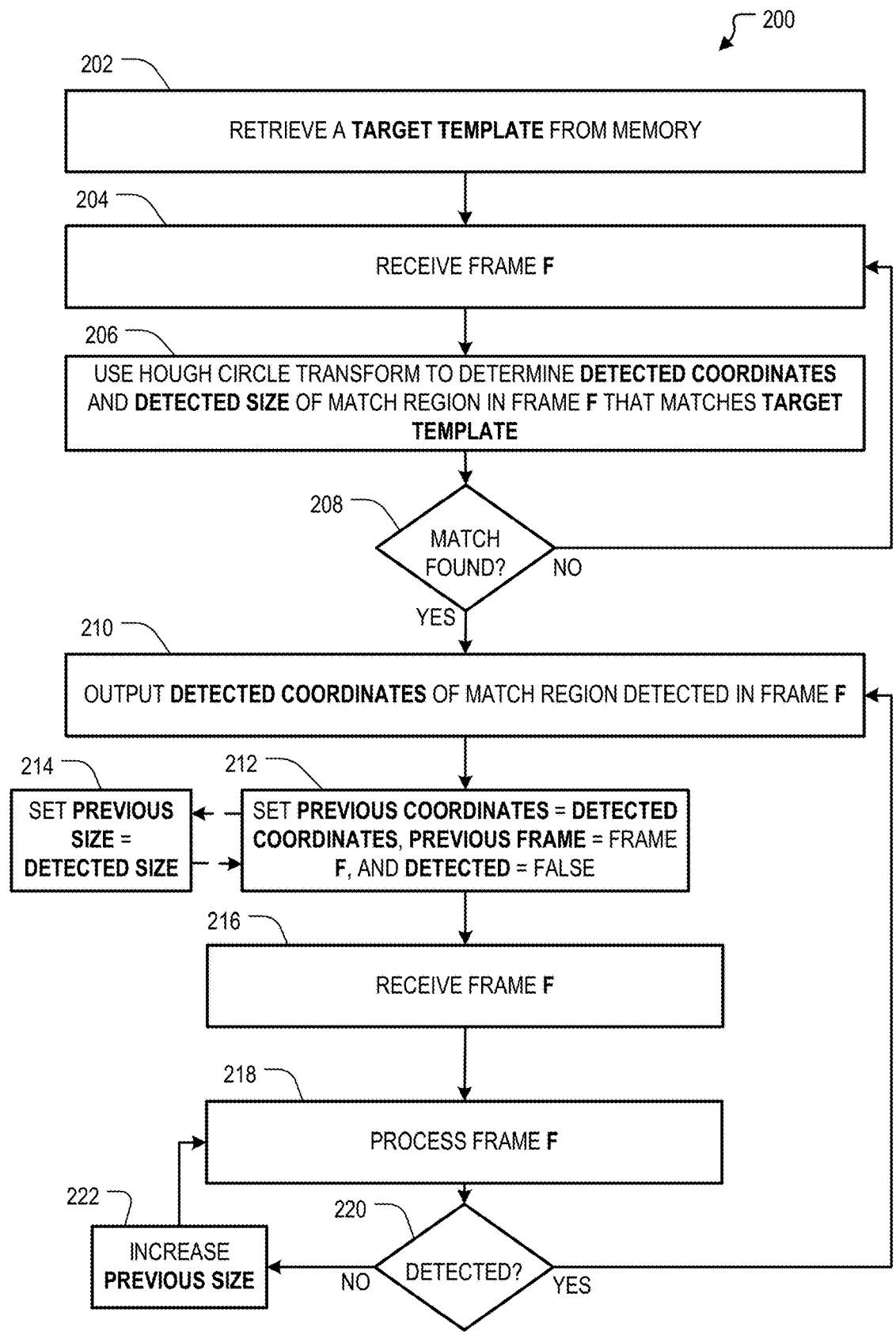
FIG. 2 is a flow diagram of an example of a method of image template based tracking that is performed by the system of FIG. 1 in a particular implementation.

Referring to FIG. 2, an example of a method of image target template based tracking is shown and generally designated as a method 200. In a particular aspect, one or more operations of the method 200 are performed by the image analyzer 112, the device 102, the system 100 of FIG. 1, or a combination thereof.

The method 200 includes retrieving a target template from memory, at 202. For example, the image analyzer 112 of FIG. 1 retrieves the target template 138 from the memory 136, as described with reference to FIG. 1.

The method 200 also includes receiving a frame F, at 204. For example, the image analyzer 112 of FIG. 1 receives an image frame 106 from the image sensor 122, as described with reference to FIG. 1.

The method 200 further includes using a Hough circle transform to determine detected coordinates and a detected size of a match region in the frame F that matches a target template, at 206. For example, the image analyzer 112 of FIG. 1 uses the image processing technique 132 (e.g., a Hough circle transform) to determine coordinates 118 and a region size of the match region 104 in the image frame 106 that matches the target template 138, as described with reference to FIG. 1.

The method 200 also includes determining whether a match is found, at 208. For example, the image analyzer 112 determines whether the image processing technique 132 indicates that the image frame 106 includes a region that matches the target template 138. The method 200, in response to a determination that a match is not found, at 208, returns to 204. For example, the image analyzer 112 of FIG. 1 discards the image frame 106 and processes a next image frame in response to determining that the image processing technique 132 indicates that the image frame 106 does not include a region that matches the target template 138.

The method 200 includes, in response to determining that a match is found, at 208, outputting the detected coordinates of the match region detected in the frame F, at 210. For example, the image analyzer 112 of FIG. 1, in response to determining that the image processing technique 132 indicates that the match region 104 of the image frame 106 matches the target template 138, outputs the coordinates 118 of the match region 104 detected in the image frame 106, as described with reference to FIG. 1.

The method 200 also includes initializing previous coordinates to the detected coordinates, the previous frame to the frame F, and detected to false, at 212. For example, the image analyzer 112 of FIG. 1 initializes one or more variables prior to processing subsequent image frames. To illustrate, the image analyzer 112 sets previous coordinates to indicate the coordinates 118, previous frame to indicate the image frame 106, and detected to false.

The method 200 further includes initializing a previous size to the detected size, at 214. For example, the image analyzer 112 of FIG. 1 sets a previous size to indicate the region size of the match region 104.

The method 200 also includes receiving a frame F, at 216. For example, the image analyzer 112 of FIG. 1 receives an image frame 108.

The method 200 further includes processing the image frame F, at 218. For example, the image analyzer 112 of FIG. 1 processes the image frame 108, as described with reference to FIGS. 1 and 3.

The method 200 also includes determining whether a match region is detected in the image frame F, at 220. For example, the image analyzer 112 of FIG. 1 determines whether a region matching the target template 138 has been detected in the image frame 108. The method 200, in response to determining that a match region is detected, at 220, returns to 210. For example, the image analyzer 112, in response to determining that the region 116 of the image frame 108 matches the target template 138, generates an output 128 indicating the coordinates 120 of the region 116.

The method 200 includes, in response to determining that the match region is not detected, at 220, increasing the previous size, at 222. For example, the image analyzer 112 increases the previous size based on a default value, a configuration setting, a user input, or a combination thereof. Increasing the previous size enables updating of the target template 138 to correspond to a larger portion of the image frame 106 that includes at least a portion of the match region 104, as further described with reference to FIG. 3.

The method 200 thus enables using the Hough circle transform to detect a match region in a particular frame and processing subsequent frames to detect match regions based on the detected match region of the particular frame. The method 200 also enables output of coordinates of the match regions.

Figure 3:
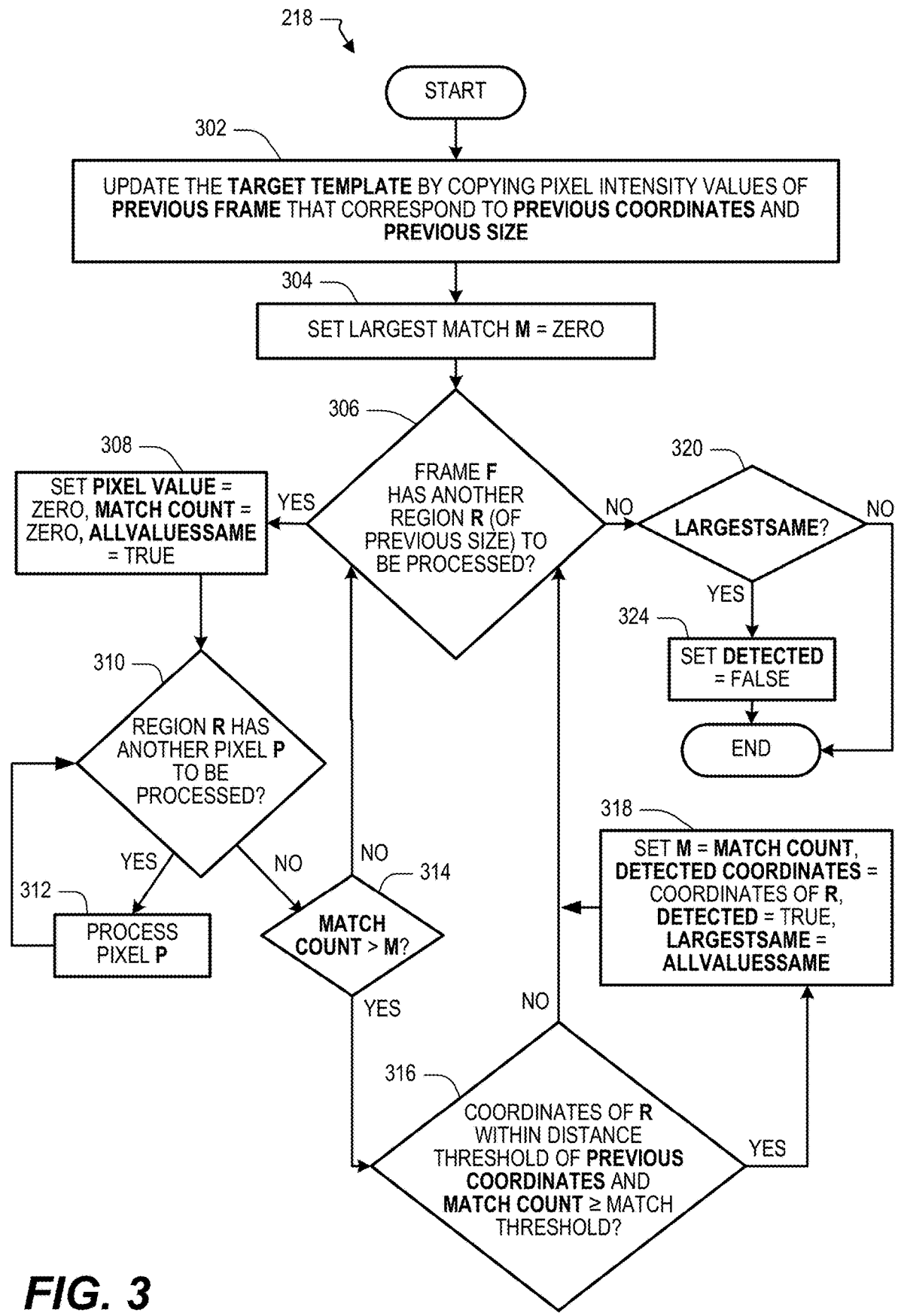
FIG. 3 is a flow diagram of an example of a method of processing a frame that is performed by the system of FIG. 1 in a particular implementation.

Referring to FIG. 3, an example of a method 218 of processing a frame F is shown. In a particular aspect, one or more operations of the method 218 are performed by the image analyzer 112, the device 102, the system 100, or a combination thereof.

The method 218 includes updating the target template by copying pixel intensity values of the previous frame that correspond to the previous coordinates and the previous size, at 302. For example, the image analyzer 112 of FIG. 1 updates the target template 138 by copying pixel values (e.g., intensity values, color values, or a combination thereof) of the image frame 106 that correspond to the coordinates 118 and the previous size. In a particular aspect, the previous size corresponds to a region size of the match region 104. In a particular aspect, the previous size is greater than the region size. For example, the image analyzer 112 increases the previous size, as described with reference to FIG. 2, to search for matches of a larger region of the target template 138 that includes the match region 104.

The method 218 includes initializing a largest match M to zero, at 304. For example, the image analyzer 112 of FIG. 1 initializes a variable indicating a largest match count to zero. In a particular aspect, the largest match count indicates a highest pixel match count detected in a region of the image frame 108.

The method 218 includes determining whether the frame F has another region R (of the previous size) to be processed, at 306. For example, the image analyzer 112 identifies a plurality of regions of the image frame 108 of the previous size (e.g., the region size or larger than the region size). The image analyzer 112 determines whether the plurality of regions includes a next region to be processed. The method 218, based on determining that the frame F includes another region R to be processed, at 306, proceeds to 308.

The method 218 includes, in response to determining that the image frame 108 includes a region 114 to be processed, initializing one or more variables based on default values. For example, in FIG. 3, the method 218 includes initializing a pixel value to zero, a match count to zero, and allvaluessame to true, at 308, and then proceeding to 310. To illustrate, the image analyzer 112 initializes a pixel value variable to zero, a variable indicating a match count for the region 114 to zero, and an allvaluessame variable to true. In a particular aspect, the allvaluessame variable is a logical variable, the value of which indicates whether all pixel values (e.g., pixel intensity values, pixel color values, or a combination thereof) of the region 114 are the same (e.g., identical). In another aspect, the allvaluessame variable indicates whether all pixel values of the region 114 correspond to a default pixel value (e.g., zero).

The method 218 includes determining whether the region R includes another pixel P to be processed, at 310. For example, the image analyzer 112 of FIG. 1 determines whether the region 114 includes another pixel to be processed.

The method 218 includes, in response to determining that the region R includes another pixel P to be processed, at 310, processing the pixel P, at 312, as further described with reference to FIG. 4. For example, the image analyzer 112 of FIG. 1 selectively updates the match count based on performing a comparison of a next pixel of the region 114 and a corresponding pixel of the target template 138, as further described with reference to FIG. 4. The method 218 returns to 310.

The method 218 includes, in response to determining that the region R does not include another pixel P to be processed, determining whether the match count for the region R is greater than the largest match M for the frame F, at 314. For example, the image analyzer 112, in response to determining that all pixels of the region 114 have been processed, determines whether the match count for the region 114 exceeds the highest pixel match count for the region 114. The method 218, in response to determining that the match count for the region R does not exceed the largest match count M for the frame F, proceeds to 306. For example, the image analyzer 112, in response to determining that the match count for the region 114 does not exceed a highest pixel match count previously detected for another region of the image frame 108, proceeds to determine whether the image frame 108 includes another region to be processed.

The method 218 includes, in response to determining that the match count for the region R is greater than the largest match M for the frame F, at 314, determining whether coordinates of the region R are within a distance threshold of the previous coordinates and whether the match count of the region R is greater than or equal to a match threshold, at 316. For example, the image analyzer 112 of FIG. 1, in response to determining that the match count for the region 114 exceeds the highest pixel match count, determines whether the coordinates of the region 114 are within the distance threshold of the coordinates 118, as described with reference to FIG. 1, and whether the match count of the region 114 satisfies (e.g., is greater than or equal to) a match count threshold. In a particular aspect, one or more thresholds described herein are based on a default value, a configuration setting, a user input, or a combination thereof. The method 218, in response to determining that the coordinates of the region 114 are not within the distance threshold of the coordinates 118 or that the match count of the region 114 is less than the match count threshold, proceeds to 306. For example, the image analyzer 112 disregards that are not within the distance threshold of the match region 104 of the image frame 106 or that include fewer than a threshold count of matching pixel values.

The method 218 includes, in response to determining that coordinates of the region R are within the distance threshold of the previous coordinates and the match count of the region R is greater than the match count threshold, at 316, setting the largest match M to indicate the match count of the region 114, setting the detected coordinates to the coordinates of the region 114, setting detected to true, and setting largestsame to allvaluessame, or a combination thereof, at 318. For example, the image analyzer 112 of FIG. 1, in response to determining that the coordinates of the region 114 are within the distance threshold of the coordinates 118 and that the match count for the region 114 is greater than or equal to the match count threshold, updates the highest pixel match count to indicate the match count for the region 114, sets detected coordinates to indicate coordinates of the region 114, sets detected to true to indicate that a matching region has been detected in the image frame 108, sets a variable (e.g., largest same) to indicate allvaluessame for the largest matching region (e.g., the region 114), or a combination thereof. The method 218 proceeds to 306. For example, the image analyzer 112, in response to determining that the image frame 108 includes additional regions to be processed, processes a next region (e.g., the region 116) of the image frame 108.

The method 218 includes, based on determining that the frame F does not include another region R to be processed, at 306, determining whether largestsame is true, at 320. For example, the image analyzer 112 of FIG. 1, in response to determining that all regions of the image frame 108 have been processed, determines whether the largest same variable indicates that the largest matching region includes all the same pixel values (e.g., the default pixel value), at 320. The method 218 includes, in response to determining that the largestsame is true, at 320, setting detected to false, at 324. For example, the image analyzer 112, in response to determining that the largest same variable indicates that each pixel of the largest matching region includes the same pixel value (e.g., the default pixel value), sets detected to false to indicate that a matching region has not been detected in the image frame 108.

The method 218, in response to determining that the largest same is false, at 320, proceeds to end. For example, the image analyzer 112, in response to determining that the largest same variable indicates that each pixel of the largest matching region (if any) does not include the same pixel value, refrains from updating detected. For example, detected remains false (e.g., initialized to false at 212 of FIG. 2) if no suitable matching region (e.g., satisfying the distance threshold and the match threshold) is found. As another example, detected remains true (e.g., set to true at 316) indicating that the largest matching region includes pixel values that are not all the same (or not the same default pixel value).

The method 218 thus enables a comparison of regions of the image frame 108 to the target template 138 that includes the match region 104 detected in the image frame 106. The method 218 identifies a region having a highest pixel match count as a closest match for the match region 104.

Figure 4:
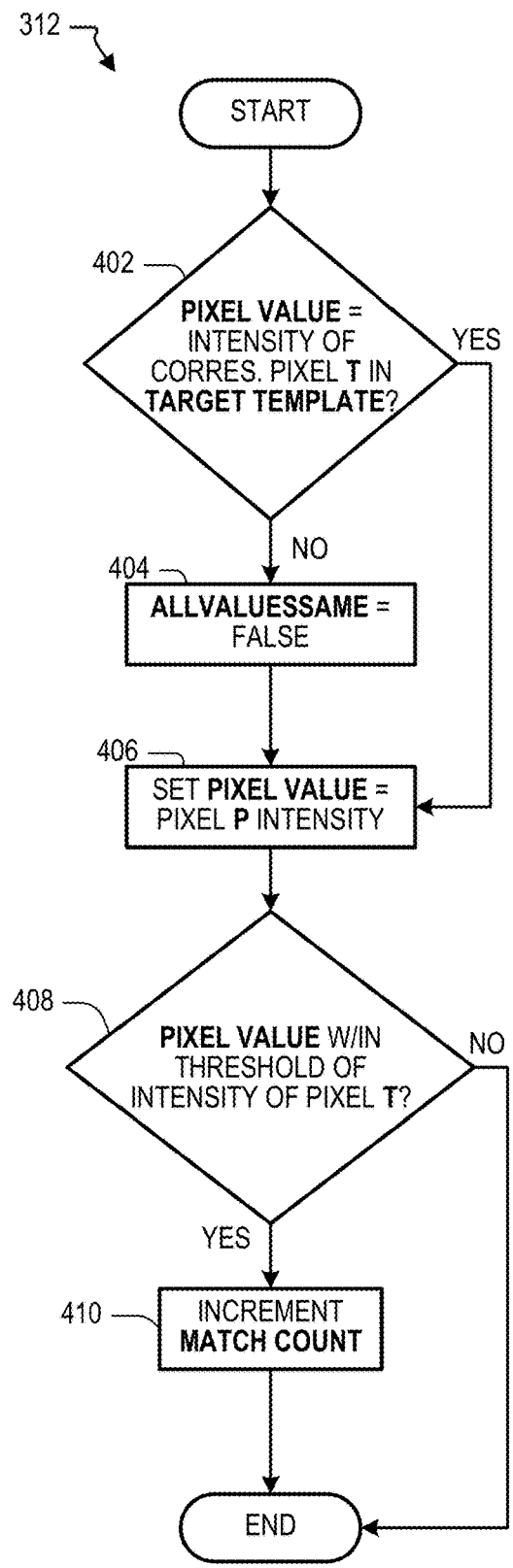
FIG. 4 is a flow diagram of an example of a method of processing a pixel that is performed by the system of FIG. 1 in a particular implementation.

Referring to FIG. 4, an example of a method 312 of processing a pixel is shown. In a particular aspect, one or more operations of the method 312 are performed by the image analyzer 112, the device 102, the system 100 of FIG. 1, or a combination thereof.

The method 312 includes determining whether the pixel value is equal to a pixel intensity value of a corresponding pixel T of the target template, at 402. For example, a pixel value variable indicates a default pixel value (e.g., 0) or a first pixel value of a previously processed pixel (e.g., a first pixel) of the region 114. The image analyzer 112, during processing of a second pixel of the region 114, identifies a second particular pixel of the target template 138 that corresponds to the second pixel of the region 114. For example, a row offset of the second pixel within the region 114 is equal to a row of the second particular pixel within the target template 138 and a column offset of the second pixel within the region 114 is equal to a column of the second pixel within the target template 138. The image analyzer 112 determines whether the pixel value variable (e.g., initialized to zero or corresponding to the first pixel) is equal to a pixel value of the second particular pixel of the target template 138.

The method 312 includes, in response to determining that the pixel value is not equal to the pixel intensity value of a corresponding pixel T of the target template, at 402, setting allvaluessame to false, at 404. For example, the image analyzer 112, in response to determining that the pixel value variable is not equal to the pixel value of the second particular pixel of the target template 138, sets the allvaluessame variable to false to indicate that the region 114 includes at least one pixel value that is different from another pixel value of the region 114 or includes at least one pixel value that is distinct from the default pixel value. The method 312, in response to determining that the pixel value variable is equal to the pixel intensity value of the corresponding pixel T of the target template, at 402, proceeds to 406.

The method 312 includes setting the pixel value to indicate a pixel intensity value of the pixel P, at 406. For example, the image analyzer 112 of FIG. 1 updates the pixel value variable to indicate a pixel value of the second pixel of the region 114.

The method 312 also includes determining whether the pixel value is within a pixel value threshold of the pixel intensity value of the pixel T of the target template, at 408.

For example, the image analyzer 112 of FIG. 1 determines whether the pixel value variable is within a pixel value threshold of the pixel value of the second particular pixel of the target template 138.

The method 312 further includes, in response to determining that the pixel value is within the pixel value threshold of the pixel intensity value of the pixel T, at 408, incrementing the match count for the region R, at 410. For example, the image analyzer 112, in response to determining that the pixel value variable is within a pixel value threshold of the pixel intensity value of the second particular pixel of the target template 138, increments (e.g., by 1) the match count for the region 114. The method 312, in response to determining that the pixel value is not within the pixel value threshold of the pixel intensity value of the pixel T, at 408, proceeds to end. For example, the image analyzer 112, in response to determining that the pixel value variable exceeds (e.g., is not within) the pixel value threshold of the pixel intensity value of the second particular pixel of the target template 138, refrains from updating the match count for the region 114.

The method 312 thus enables determining a match count for a region based on a pixel-by-pixel comparison. In a particular aspect, the method 312 enables detecting whether each pixel of the region includes the same pixel value (e.g., a default pixel value). In a particular implementation, the image analyzer 112 disregards regions that indicate the same pixel value for each pixel.

Figure 5:
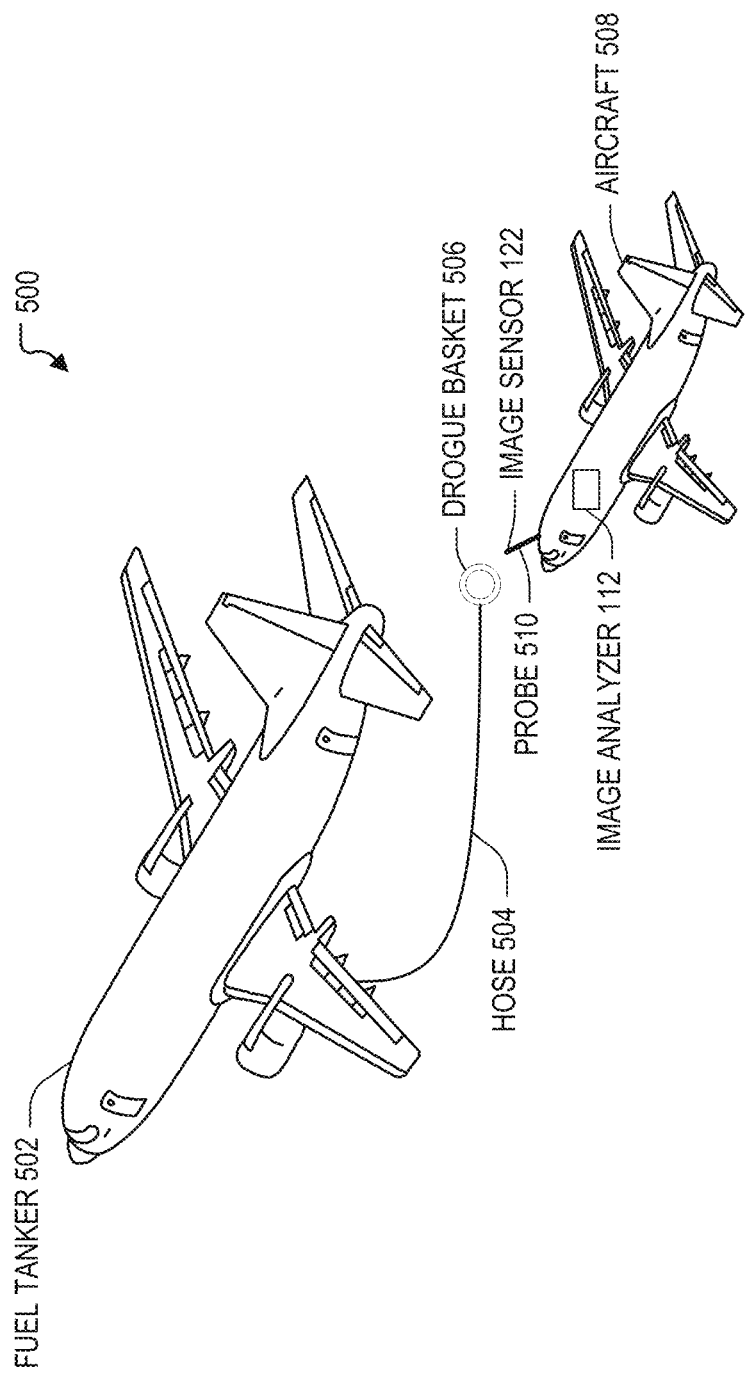
FIG. 5 illustrates an example of tracking a drogue basket that is performed by the system of FIG. 1 in a particular implementation.

Referring to FIG. 5, an example of tracking a drogue basket using the image analyzer 112 of FIG. 1 is shown and generally designated as an example 500. The example 500 includes a fuel tanker 502 and an aircraft 508.

The fuel tanker 502 is coupled via a hose 504 to a drogue basket 506. The aircraft 508 includes a probe 510 that is configured to couple with (e.g., physically attach to) the drogue basket 506. The fuel tanker 502 is configured to provide fuel via the hose 504 to the aircraft 508 while the probe 510 is coupled to the drogue basket 506.

The aircraft 508 includes the image analyzer 112 and the image sensor 122. In a particular aspect, the image sensor 122 is located at or near an end of the probe 510. During operation, a pilot activates the image sensor 122 to capture image frames 130. The image analyzer 112 processes the image frames 130 to detect coordinates (e.g., the coordinates 118 and the coordinates 120) of the drogue basket 506 and provides the coordinates to a display 124, a navigation system, or both, of the aircraft 508. The pilot, the navigation system, or both, maneuver the aircraft 508, the probe 510, or both, based on the coordinates to engage the probe 510 with the drogue basket 506 to initiate refueling of the aircraft 508.

Figure 6:
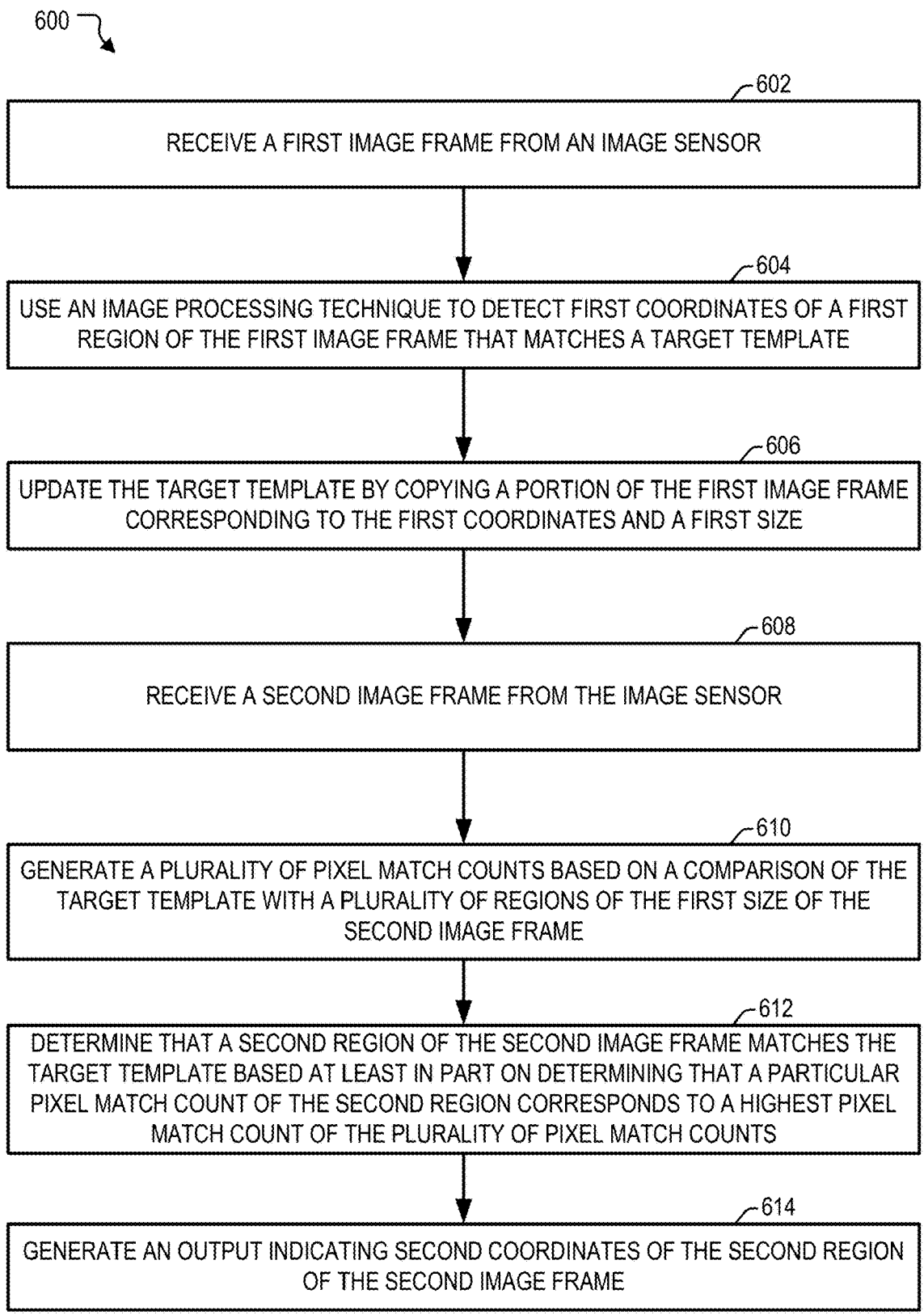
FIG. 6 is a flow diagram of a method of image template based tracking that is performed by the system of FIG. 1 in a particular implementation.

Referring to FIG. 6, an example of a method of image template based tracking is shown and generally designated 600. In a particular aspect, one or more operations of the method 600 are performed by the image analyzer 112, the device 102, the system 100, or a combination thereof.

The method 600 includes receiving a first image frame from an image sensor, at 602. For example, the image analyzer 112 of FIG. 1 receives the image frame 106 from the image sensor 122, as described with reference to FIG. 1.

The method 600 also includes using an image processing technique to detect first coordinates of a first region of the first image frame that matches a target template, at 604. For example, the image analyzer 112 uses an image processing technique 132 to detect coordinates 118 of the match region 104 of the image frame 106 that matches the target template 138, as described with reference to FIG. 1.

The method 600 further includes updating the target template by copying a portion of the first image frame corresponding to the first coordinates and a first size, at 606. For example, the image analyzer 112 of FIG. 1 updates the target template 138 by copying a portion of the image frame 106 corresponding to the coordinates 118 and a first size, as described with reference to FIG. 1.

The method 600 also includes receiving a second image frame from the image sensor, at 608. For example, the image analyzer 112 of FIG. 1 receives the image frame 108 from the image sensor 122.

The method 600 further includes generating a plurality of pixel match counts based on a comparison of the target template with a plurality of regions of the first size of the second image frame, at 610. For example, the image analyzer 112 of FIG. 1 generates plurality of pixel match counts based on a comparison of the target template 138 with a plurality of regions of the first size of the image frame 108, as described with reference to FIG. 1.

The method 600 also includes determining that a second region of the second image frame matches the target template based at least in part on determining that a particular pixel match count of the second region corresponds to a highest pixel match count of the plurality of pixel match counts, at 612. For example, the image analyzer 112 of FIG. 1 determines that a region 116 of the image frame 108 matches the target template 138 based at least in part on determining that a pixel match count of the region 116 corresponds to a highest pixel match count of the plurality of pixel match counts, as described with reference to FIG. 1.

The method 600 further includes generating an output indicating second coordinates of the second region of the second image frame, at 614. For example, the image analyzer 112 of FIG. 1 generates an output 128 indicating the coordinates 120 of the region 116 of the image frame 108.

The method 600 thus enables using an image processing technique to detect an object in a particular image frame that matches a target template and using pixel-by-pixel comparison to detect the object in subsequent image frames. The pixel-by-pixel comparison is performed based on the matching region detected by the image processing technique. The pixel-by-pixel comparison may be performed based on the matching region that more closely (as compared to the target template) matches the object as captured by the image sensor.

Figure 7:
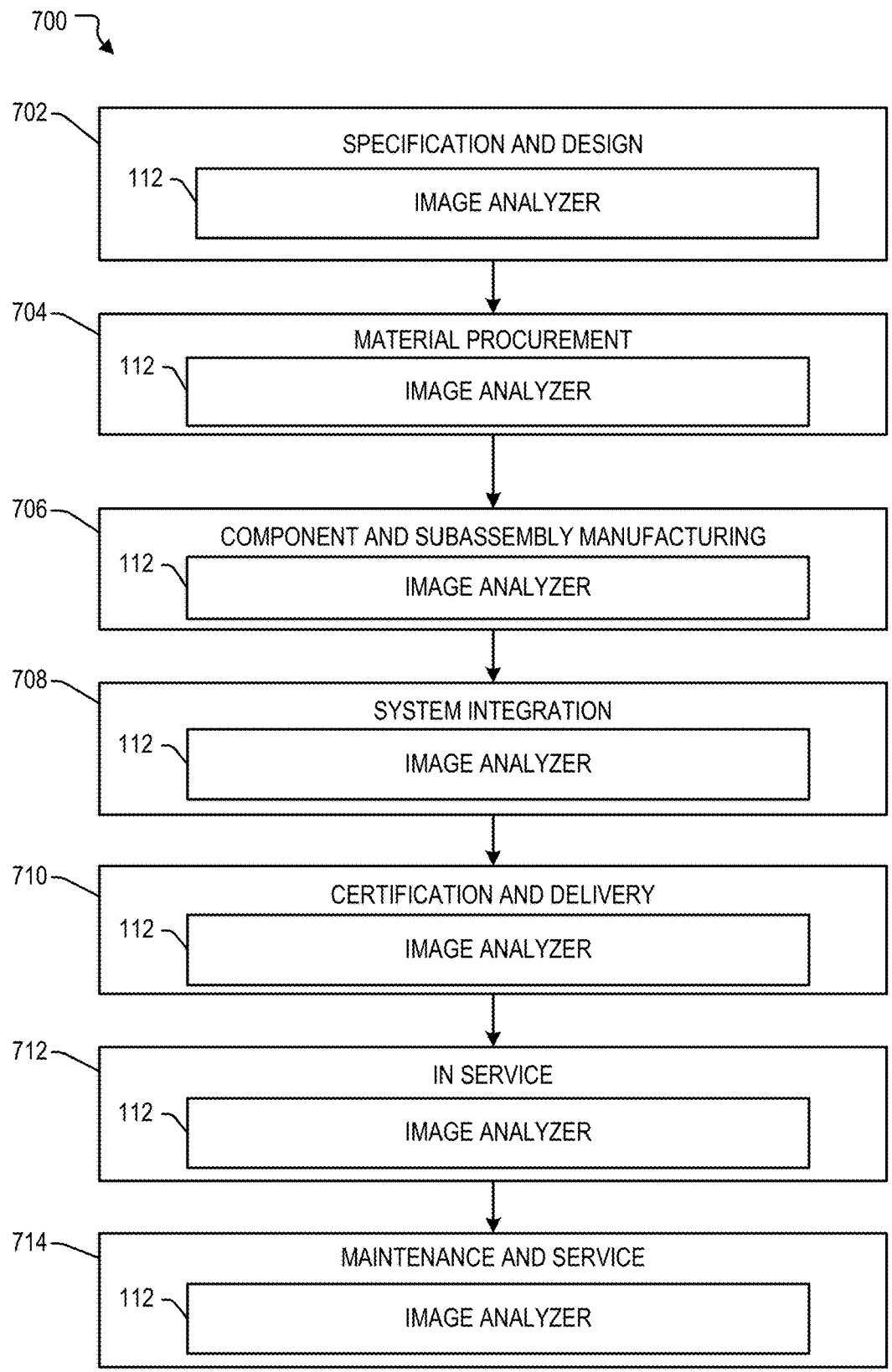
FIG. 7 is a flow diagram illustrating a life cycle of an aircraft that is configured to perform image template based tracking.

Referring to FIG. 7, a flow diagram illustrative of a life cycle of an aircraft that includes the image analyzer 112 is shown and designated 700. During pre-production, the exemplary method 700 includes, at 702, specification and design of an aircraft, such as the aircraft 800 described with reference to FIG. 8. During specification and design of the aircraft, the method 700 may include specification and design of the image analyzer 112. At 704, the method 700 includes material procurement, which may include procuring materials for the image analyzer 112.

During production, the method 700 includes, at 706, component and subassembly manufacturing and, at 708, system integration of the aircraft. For example, the method 700 may include component and subassembly manufacturing of the image analyzer 112 and system integration of the image analyzer 112. At 710, the method 700 includes certification and delivery of the aircraft and, at 712, placing the aircraft in service. Certification and delivery may include certification of the image analyzer 112 to place the image analyzer 112 in service. While in service by a customer, the aircraft may be scheduled for routine maintenance and service (which may also include modification, reconfiguration, refurbishment, and so on). At 714, the method 700 includes performing maintenance and service on the aircraft, which may include performing maintenance and service on the image analyzer 112.

Each of the processes of the method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 800 as shown in FIG. 8.

In the example of FIG. 8, the aircraft 800 includes an airframe 818 with a plurality of systems 820 and an interior 822. Examples of the plurality of systems 820 include one or more of a propulsion system 824, an electrical system 826, an environmental system 828, a hydraulic system 830, and a mid-air refueling system 832, which in FIG. 8 includes the image analyzer 112 and the image sensor 122. Any number of other systems may be included.

Figure 9:
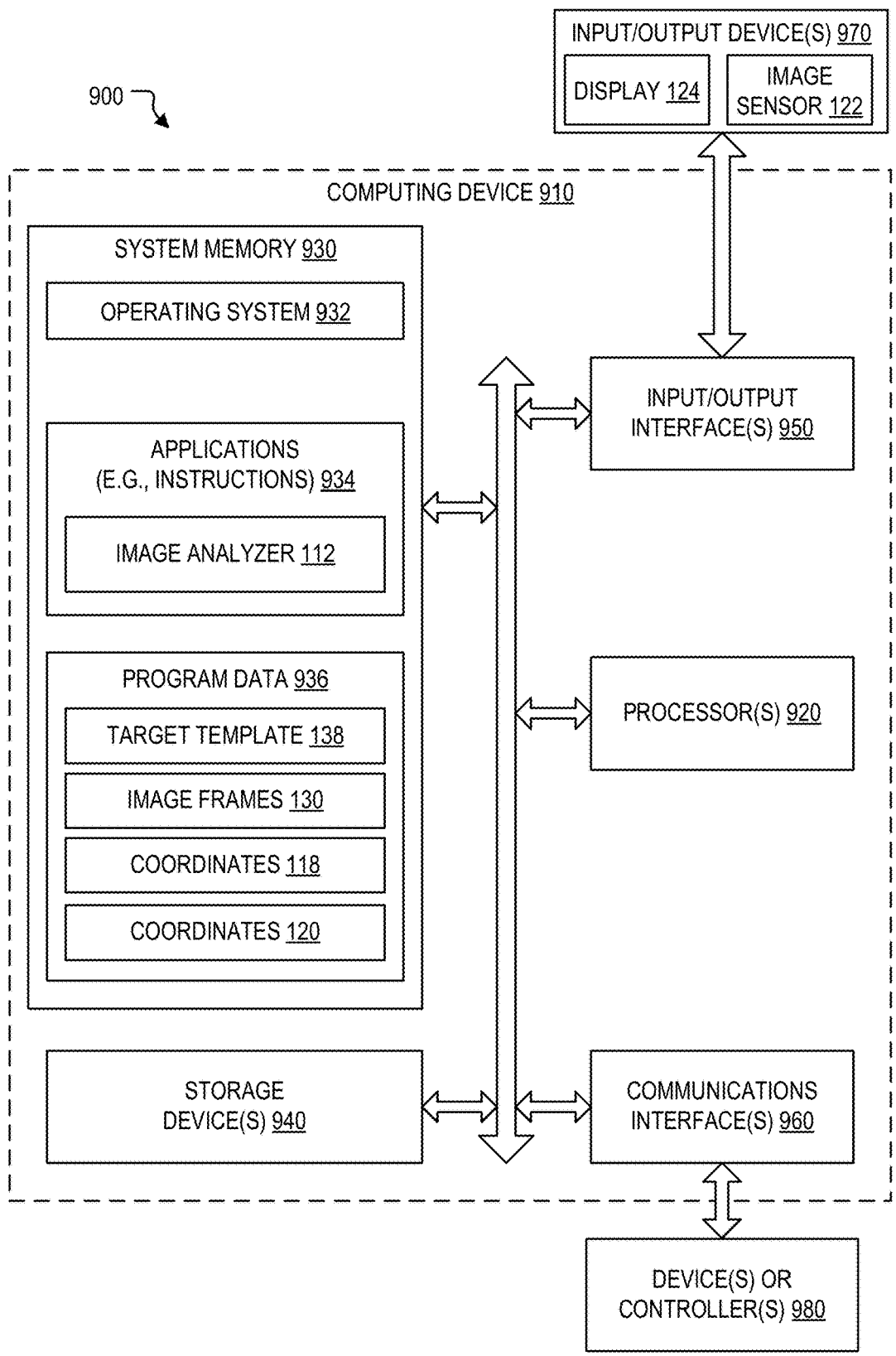
FIG. 9 is a block diagram of a computing environment including a computing device configured to support aspects of computer-implemented methods and computer-executable program instructions (or code) according to the present disclosure.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-8.

The computing device 910 includes one or more processors 920. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 936, such as the target template 138, the image frames 130, the coordinates 118, the coordinates 120, or a combination thereof. In a particular aspect, the system memory 930 includes the memory 136 of FIG. 1.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8. To illustrate, the one or more applications 934 include instructions executable by the processor(s) 920 to initiate, control, or perform one or more operations described with reference to the image analyzer 112, or a combination thereof.

In a particular implementation, the system memory 930 includes a non-transitory, computer readable medium storing the instructions that, when executed by the processor(s) 920, cause the processor(s) 920 to initiate, perform, or control operations to perform image template based tracking of an object. The operations include receiving a first image frame from an image sensor and using an image processing technique to detect first coordinates of a first region of the first image frame that matches a target template. The operations also include updating the target template by copying a portion of the first image frame corresponding to the first coordinates and a first size. The operations further include receiving a second image frame from the image sensor and generating a plurality of pixel match counts based on a comparison of the target template with a plurality of regions of the first size of the second image frame. The operations also include determining that a second region of the second image frame matches the target template based at least in part on determining that a particular pixel match count of the second region corresponds to a highest pixel match count of the plurality of pixel match counts. The operations further include generating an output indicating second coordinates of the second region of the second image frame.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910.

The one or more input/output interfaces 950 enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 970 includes one or more user interface devices and displays, including some combination of buttons, keyboards, pointing devices, displays, speakers, microphones, touch screens, and other devices. For example, the input/output device 970 includes the image sensor 122, the display 124, or both.

The processor(s) 920 are configured to communicate with devices or controllers 980 via the one or more communications interfaces 960. For example, the one or more communications interfaces 960 can include a network interface.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-9. In some implementations, part or all of one or more of the operations or methods of FIGS. 1-9 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for image processing comprising:
   a memory configured to store a target template; and
   one or more processors configured to:
   receive a first image frame from an image sensor;
   use an image processing technique to detect first coordinates of a first region of the first image frame that matches the target template;
   update the target template by copying a portion of the first image frame corresponding to the first coordinates and a first size;
   receive a second image frame from the image sensor;
   generate a plurality of pixel match counts based on a comparison of the target template with a plurality of regions of the first size of the second image frame;
   determine that a second region of the second image frame matches the target template based on at least in part on determining that the second region does not include all the same pixel values and based at least in part on determining that a particular pixel match count of the second region corresponds to a highest pixel match count of the plurality of pixel match counts; and
   generate an output indicating second coordinates of the second region of the second image frame.

2. The device of claim 1, wherein the image processing technique includes a Hough circle transform.

3. The device of claim 1, wherein the first size is based on a region size of the first region detected by using the image processing technique.

4. The device of claim 1, wherein the first size is based on a configuration setting, a default value, a user input, or a combination thereof.

5. The device of claim 1, wherein the one or more processors are further configured to, based on determining that a first pixel value of a first pixel of the second region is within a pixel value threshold of a second pixel value of a corresponding pixel of the target template, increment the particular pixel match count of the second region.

6. The device of claim 5, wherein the first pixel value includes a pixel intensity value.

7. The device of claim 1, wherein the one or more processors are configured to determine that the second region matches the target template based on determining that the second coordinates of the second region are within a distance threshold of the first coordinates of the first region.

8. The device of claim 1, wherein the one or more processors are configured to determine that the second region matches the target template based on determining that the particular pixel match count satisfies a match count threshold.

9. The device of claim 1, wherein the same pixel values correspond to a default pixel value.

10. The device of claim 1, wherein the first image frame includes an infrared image frame.

11. A method of image processing comprising:
    receiving a first image frame from an image sensor;
    using an image processing technique to detect first coordinates of a first region of the first image frame that matches a target template;
    updating the target template by copying a portion of the first image frame corresponding to the first coordinates and a first size;
    receiving a second image frame from the image sensor;
    generating a plurality of pixel match counts based on a comparison of the target template with a plurality of regions of the first size of the second image frame;
    determining that a second region of the second image frame matches the target template based at least in part on determining that the second region does not include all the same pixel values and based at least in part on determining that a particular pixel match count of the second region corresponds to a highest pixel match count of the plurality of pixel match counts; and
    generating an output indicating second coordinates of the second region of the second image frame.

12. The method of claim 11, wherein the first size is based on a region size of the first region detected by using the image processing technique.

13. The method of claim 11, further comprising, based on determining that a first pixel value of a first pixel of the second region is within a pixel value threshold of a second pixel value of a corresponding pixel of the target template, incrementing the particular pixel match count of the second region.

14. The method of claim 13, wherein the first pixel value includes a pixel intensity value.

15. The method of claim 11, wherein the second region is determined to match the target template based on determining that the second coordinates of the second region are within a distance threshold of the first coordinates of the first region.

16. The method of claim 11, wherein the second region is determined to match the target template based on determining that the particular pixel match count satisfies a match count threshold.

17. The method of claim 11, wherein the same pixel values correspond to a default pixel value.

18. The method of claim 11, wherein the first image frame includes an infrared image frame.

19. A computer-readable storage device storing instructions that, when executed by one or more processors, cause the one or more processors to:
   receive a first image frame from an image sensor;
   use an image processing technique to detect first coordinates of a first region of the first image frame that matches a target template;
   update the target template by copying a portion of the first image frame corresponding to the first coordinates and a first size;
   receive a second image frame from the image sensor;
   generate a plurality of pixel match counts based on a comparison of the target template with a plurality of regions of the first size of the second image frame;
   determine that a second region of the second image frame matches the target template based at least in part on determining that the second region does not include all the same pixel values and based at least in part on determining that a particular pixel match count of the second region corresponds to a highest pixel match count of the plurality of pixel match counts; and
   generate an output indicating second coordinates of the second region of the second image frame.

20. The computer-readable storage device of claim 19, wherein the second region is determined to match the target template based on determining that the second coordinates of the second region are within a distance threshold of the first coordinates of the first region.

* * * * *